US006665770B2

(12) United States Patent
Koga

(10) Patent No.: US 6,665,770 B2
(45) Date of Patent: Dec. 16, 2003

(54) DEVICE AND METHOD FOR UPDATING A POINTER VALUE BY SWITCHING BETWEEN POINTER VALUES

(75) Inventor: Yoshihiro Koga, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 164 days.

(21) Appl. No.: 10/057,878

(22) Filed: Jan. 29, 2002

(65) Prior Publication Data

US 2002/0103979 A1 Aug. 1, 2002

(30) Foreign Application Priority Data

Jan. 31, 2001 (JP) ......................... 2001-022940

(51) Int. Cl.[7] .................... G06F 9/32; G06F 13/14; G06F 12/02
(52) U.S. Cl. .............. 711/109; 711/150; 711/220; 370/360; 370/363; 710/31
(58) Field of Search .................. 370/360, 363; 708/505; 710/29, 31; 711/109, 150, 205, 220; 709/108

(56) References Cited

U.S. PATENT DOCUMENTS

| 4,025,904 A | * | 5/1977 | Adney et al. | ............... 709/108 |
| 4,434,461 A | * | 2/1984 | Puhl | ............................ 710/260 |
| 5,163,154 A | * | 11/1992 | Bournas et al. | ............... 712/42 |
| 5,204,836 A | * | 4/1993 | Reed | .......................... 365/200 |
| 6,240,482 B1 | * | 5/2001 | Gates et al. | ................ 710/306 |
| 6,408,325 B1 | * | 6/2002 | Shaylor | ...................... 709/108 |

FOREIGN PATENT DOCUMENTS

| DE | 3914195 A1 | * | 10/1990 |
| EP | 0 955 583 A2 | * | 11/1999 |
| JP | 9-106372 | | 4/1997 |
| JP | 10-3378 | | 1/1998 |
| JP | 10224367 A | * | 8/1998 |

* cited by examiner

Primary Examiner—B. James Peikari
(74) Attorney, Agent, or Firm—McDermott, Will & Emery

(57) ABSTRACT

In order to enable a pointer register device including registers called shadow registers to conduct updating operation rapidly by arithmetic operation of a pointer value between the registers, a front/back register set includes a first register and a second register. A switch control section allows a read select switch and a write select switch to select different registers. When the read select switch selects the first register and the write select switch selects the second register, the sum obtained by an adder can be stored in the second register while retaining the pointer value of the first register. In this case, the pointer value need not be transferred between the registers.

5 Claims, 8 Drawing Sheets

FIG. 4

| ADDRESS | DATA OF ARRAY $\alpha[i][j]$ | INDEX i, j |
|---|---|---|
| B | | i = 0, j = 0 |
| B + 1 | | i = 0, j = 1 |
| B + 2 | | i = 0, j = 2 |
| ⋮ | ⋮ | ⋮ |
| B + C | | i = 1, j = 0 |
| B + C + 1 | | i = 1, j = 1 |
| B + C + 2 | | i = 1, j = 2 |
| ⋮ | ⋮ | ⋮ |
| B + 2 C | | i = 2, j = 0 |
| B + 2 C + 1 | | i = 2, j = 1 |
| B + 2 C + 2 | | i = 2, j = 2 |
| ⋮ | ⋮ | ⋮ |

DEVICE AND METHOD FOR UPDATING A POINTER VALUE BY SWITCHING BETWEEN POINTER VALUES

BACKGROUND OF THE INVENTION

1. Field of the Invention

The present invention generally relates to a pointer register device for retaining a pointer value (i.e., an address for accessing a memory), updating the pointer value by arithmetic operation, and the like in, e.g., a processor included in a computer. More particularly, the present invention relates to a pointer register device including a register called a shadow register (back register) and a method for updating a pointer value.

2. Description of the Related Art

For example, a processor included in a computer includes registers for retaining a pointer value (i.e., an address for accessing a memory). The registers can be accessed more rapidly than the memories. Therefore, the registers are used to store a pointer value that is frequently or continuously referred to. As the processing of the processor is complicated, the number of pointer values to be stored in the registers is also increased. If the number of pointer values to be stored in the registers exceeds the number of registers that are actually included in the processor, data transfer must be frequently conducted between the registers and the memory, degrading the processing efficiency. If the number of registers is increased, the number of instructions and the instruction length are also increased. In other words, the number of instructions must be increased according to the increase in the number of registers, and the instruction length must be increased in order to specify the register in each instruction. This complicates the hardware and the circuit scale.

A known method to increase the substantial number of registers without increasing the apparent number of registers (i.e., the number of registers when viewed from the software) is to provide registers called shadow registers or back registers. In this method, the processor includes a register set (including two registers) capable of being accessed in an alternative manner, instead of a commonly used independent register. In this case, the same instruction set is used as that in the case where there is only a selected register, except that it includes an instruction to select one of the registers. The resultant processing capability is approximately the same as that obtained when the number of registers is increased. Moreover, this processing capability can be obtained without causing disadvantages like a complicated instruction set. Note that the term "register set" herein refers to a set of registers that are used in an alternative manner. Therefore, the "register set" is different from a "register pair", i.e., a pair of registers that are used together as a single register having a double bit length.

In a known configuration using such a register set, a base value is retained in the non-selected register and the base value plus or minus a prescribed offset value is stored in the selected register for later reference. This configuration makes good use of the two registers and enables efficient operation of the offset. Moreover, since it is only the selected register that can be directly accessed by an instruction, this configuration can be implemented without complicating the instruction set.

Hereinafter, the specific structure of a conventional pointer register device including such a register set will be described.

FIG. 6 is a circuit diagram of the structure of a conventional pointer register device.

In FIG. 6, a front/back register set 201 includes a first register 201a and a second register 201b for retaining a pointer value. The front/back register set 201 is basically recognized as a single register when viewed from the outside of the pointer register device (i.e., from a program instruction). Either the register 201a or 201b selected according to the program instruction is accessed. In other words, in reading and writing a pointer value, the registers 201a, 201b need not be distinguished from the outside. (Note that the terms "front" and "back" are merely used to distinguish the selected register from the non-selected one, and are not used to fixedly distinguish between the first and second registers 201a, 201b.)

A transfer switch set 202 includes switches 202a, 202b respectively corresponding to the registers 201a, 201b. The transfer switch set 202 selects either writing the addition result of an adder 205 or a pointer value applied from the outside of the pointer register device, or transferring a pointer value between the registers 201a, 201b (i.e., writing a pointer value retained in one register to the other).

A transfer path 203 is a signal path for transferring a pointer value between the registers 201a, 201b.

A register select switch set 204 includes a read select switch 204a and a write select switch 204b. The register select switch set 204 selects either the register 201a or 201b in order to read or write a pointer value.

The adder 205 adds a pointer value retained in the register 201a, 201b and an additional value applied from the outside of the pointer register device.

An adder select switch 206 selects either the addition result of the adder 205 or a write pointer value applied from the outside of the pointer register device for input to the front/back register set 201.

A switch control section 207 controls the respective switching states of the transfer switch set 202, the register select switch set 204 and the adder select switch 206. For example, the switch control section 207 retains information designating the register (201a or 201b) from or to which a pointer value is to be read or written, and outputs a switch signal S based on that information to switch the register selector switch set 204.

A program-instruction execution control section 208 controls operation of each part based on a program instruction. When executing a program instruction to switch to the register 201a, 201b, the program-instruction execution control section 208 instructs the switch control section 207 to switch the register select switch set 204 accordingly. Basically, when executing other program instructions including an instruction to write or read a pointer value, the program-instruction execution control section 208 will not instruct the switch control section 207 to switch the register select switch set 204. As described above, the pointer value is thus written to or read from either the register 201a or 201b that has already been selected. However, during the operations of updating a pointer value described below, the program-instruction execution control section 208 controls switching of the register select switch set 204 or the like as necessary.

Typical operations in the above pointer register device include: (A) "relative-pointer updating operation"; (B) "base-pointer updating operation"; and (C) "initial-pointer updating operation". Hereinafter, these operations will be described specifically.

(A) Relative-Pointer Updating Operation

The relative-pointer updating operation (hereinafter, operation (A)) is the operation of replacing an original pointer value retained in the front/back register set 201 with a pointer value for actual access to a memory (i.e., an effective address). More specifically, the original pointer value retained in one register of the front/back register set 201 and a relative pointer value designated by a program instruction or the like are added, and the sum is written to that register.

Operation (A) will now be described specifically with reference to FIG. 7. It is herein assumed that an original pointer value A retained in the first register 201*a* is to be replaced with the sum of the original pointer value A and an additional value C, i.e., (A+C).

(0) The respective switching states of the register select switch set 204 and the transfer switch set 202 are as shown in FIG. 7 before operation (A). More specifically, the switches 204*a*, 204*b* select the first register 201*a*, and the switch 202*a* allows the sum obtained by the adder 205 to be written to the first register 201*a*. In this state, it is possible to output a pointer value in the first register 201*a* to the outside of the pointer register device according to a program instruction to access a memory. It is also possible to write an additional pointer value to the first register 201*a* if the adder select switch 206 is switched to select an external write pointer value.

(1) In this state, the pointer value A read from the first register 201*a* and the external additional value C are applied to the adder 205. The adder 205 adds the pointer value A and the value C. The sum (A+C) is then written to the first register 201*a*.

The above operation is given by the following assignment statement:

$$X=(X;\ A)+C\text{(as a result, }X;\ (A+C))$$

where "X" is a variable indicating the first register 201*a*, and "X; A" indicates the state in which the first register 201*a* retains the pointer value A therein.

In the case where the first register 201*a* can be written and read simultaneously (e.g., in the case where the first register 201*a* is based on a master-slave-type flip-flop), the above operation (A) can be conducted in a single machine cycle.

Note that the same operation is conducted even when the second register 201*b* is selected instead of the first register 201*a*. In other words, "201*a*" and "201*b*" are merely used to distinguish the selected register from the non-selected one. The same operation is conducted whether the register 201*a* or 201*b* is selected. The same applies to the following description.

(B) Base-Pointer Updating Operation

The base-pointer updating operation (hereinafter, operation (B)) is the operation of obtaining the sum of a pointer value (base pointer value) retained in the front/back register set 201 and a relative pointer value, as in operation (A). Operation (B) is different from operation (A) in that the sum thus obtained is stored in the other register (i.e., the register that does not retain the base pointer value). Provided that the base pointer value B is retained in one register (e.g., the second register 201*b*), the sum of the base pointer value B and the additional value C, (B+C), must be stored in the other register (first register 201*a*). This is because the base pointer value B need be stored for use in later processing. Operation (B) will now be described specifically.

(0) The respective switching states of the register select switch set 204 and the transfer switch set 202 are as shown in FIG. 8A before operation (B). More specifically, the switches 204*a*, 204*b* select the first register 201*a*, and the switch 202*a* allows the sum obtained by the adder 205 to be written to the first register 201*a*.

(1) In operation (B), the switch 202*a* is first switched to the transfer path 203 as shown in FIG. 8B, so that the base pointer value B read from the second register 201*b* is written (transferred) to the first register 201*a*.

(2) The switch 202*a* is then switched back to the adder 205. As in step (1) of operation (A) (FIG. 7), the base pointer value B thus transferred is read from the first register 201*a*. The adder 205 then adds the base pointer value B and the additional value C. The sum (B+C) is then written to the first register 201*a*.

The above operation is given by the following assignment statement:

$$X=(Y;\ B)\text{ (as a result, }X;\ B)$$

$$X=(X;\ B)+C\text{ (as a result, }X;\ (B+C))$$

where "X" is a variable indicating the first register 201*a*, "Y" is a variable indicating the second register 201*b*, "Y; B" indicates the state in which the second register 201*b* retains the base pointer value B therein, and "X; B" indicates the state in which the first register 201*a* retains the base pointer value B therein.

In operation (B), the steps of reading and adding the transferred base pointer value and storing the addition result can be conducted in a single machine cycle as in operation (A). However, these steps cannot be conducted simultaneously with the step of transferring the base pointer value. Therefore, at least two machine cycles are required for operation (B).

(C) Initial-Pointer Updating Operation

The initial-pointer updating operation (hereinafter, operation (C)) is used for, e.g., loop processing (processing of sequentially accessing the elements in an array). For example, in operation (C), the pointer value B retained in the second register 201*b* is transferred to the first register 201*a* for use as a base pointer value of operation (A) in the following loop processing. In addition, the pointer value B retained in the second register 201*b* is replaced with the sum of the pointer value B and the additional value C, (B+C), for use as a base pointer value in the loop processing subsequent to the above following loop processing.

Operation (C) will Now be Described Specifically.

(0) The state before operation (C) is the same as that described in step (0) of operation (B) (FIG. 8A).

(1) The pointer value is transferred from the second register 201*b* to the first register 201*a* in the same manner as that described in step (1) of operation (B) (FIG. 8B).

(2) As shown in FIG. 9A, the register select switch set 204 is then switched to the second register 201*b*. As in step (1) of operation (A) (FIG. 7) (except that the selected register is herein the second register 201*b*), the pointer value B is read from the second register 201*b*. The adder 205 then adds the pointer value B and the additional value C. The sum (B+C) is then written to the second register 201*b*. As shown in FIG. 9B, the register select switch set 204 is then switched back to the first register 201*a*. In this way, the pointer value B retained in the second register 201*b* is transferred to the first register 201*a* for use as a base pointer value or the like. In addition, the pointer value (B+C) is retained in the second register 201*b* for later use.

The above operation is given by the following assignment statement:

$$X=(Y;\ B)\text{ (as a result, }X;\ B)$$

$$Y=(Y;\ B)+C\text{ (as a result, }Y;\ (B+C)).$$

In operation (C) as well, the steps of reading and adding the transferred pointer value and storing the addition result cannot be conducted simultaneously with the step of transferring the pointer value. Therefore, at least two machine cycles are required for operation (C).

The above conventional pointer register device requires the transfer path 203 and the transfer switch set 202 for operations (B), (C) and the like, resulting in large circuit scale.

Moreover, at least two machine cycles are required for operations (B), (C) and the like, requiring a large amount of processing overhead.

SUMMARY OF THE INVENTION

It is an object of the present invention to provide a pointer register device capable of implementing improved processing efficiency while suppressing the circuit scale and processing overhead, and a method for updating a pointer value.

In order to achieve the above object, according to a first aspect of the present invention, a pointer register device includes a register set, a read select section, a write select section, a switch control section, an adding section, and a program-instruction execution control section. The register set includes a plurality of pointer registers for retaining a pointer value. The read select section selects a pointer register from the register set in order to read a pointer value therefrom. The write select section selects a pointer register from the register set in order to write a pointer value thereto. The switch control section controls respective switching states of the read select section and the write select section. The adding section adds the pointer value read from the pointer register selected by the read select section and a prescribed additional value, and writes the sum to the pointer register selected by the write select section. The program-instruction execution control section is responsive to a program instruction, for controlling operation of writing a pointer value applied from outside of the pointer register device to a pointer register that is selected in advance before executing the program instruction, and reading a pointer value from the selected pointer register to the outside of the pointer register device. The switch control section allows the read select section and the write select section to select different pointer registers.

According to the above pointer register device, the write select section selects a pointer register different from that of the read select section. This enables the same pointer value as that read from a pointer register to be retained therein while replacing a pointer value in another pointer register with the sum obtained by the adding section. In this case, the pointer value need not be transferred between the pointer registers. As a result, various pointer operations can be conducted rapidly. Moreover, no transfer path is required between the pointer registers, whereby the circuit scale can be suppressed.

Preferably, when a prescribed program instruction is executed with a first pointer register of the register set being selected by the read select section and the write select section, the read select section first selects a second pointer register of the register set. The adding section then adds a pointer value read from the second pointer register and the prescribed additional value and writes the sum to the first pointer register. Thereafter, the read select section selects the first pointer register again.

According to the above pointer register device, for example, an effective address, i.e., the sum of a base pointer value retained in the second pointer register and a relative value, can be stored in the first pointer register without changing the base pointer value in the second pointer register. Moreover, the pointer value need not be transferred between the pointer registers. As a result, the above updating operation can be conducted at a high speed.

Preferably, when a prescribed program instruction is executed with a first pointer register of the register set being selected by the read select section and the write select section, the read select section first selects a second pointer register of the register set. The adding section then adds a pointer value read from the second pointer register and the prescribed additional value and writes the sum to the first pointer register. Thereafter, the write select section selects the second pointer register.

According to the above pointer register device, in, e.g., loop processing, the sum of the pointer value in the second register and a relative value is stored in the first pointer register for use in the following loop processing. Moreover, the read select section is switched to the second pointer register so that the pointer value in the second pointer register can be used in the loop processing subsequent to the above following loop processing. Since the pointer value need not be transferred between the pointer registers, the above updating operation can be conducted at a high speed.

According to another aspect of the present invention, a method for updating a pointer value by using the above pointer register device includes the steps of: switching the read select section to select a second pointer register of the register set from a state where the read select section and the write select section selects a first pointer register of the register set; adding a pointer value read from the second pointer register and the prescribed additional value and writing the sum to the first pointer register by using the adding section; and switching the read select section to select the first pointer register again.

According to the above method, the operation of updating a pointer value can be conducted at a high speed, as in the case of the above pointer register device.

According to still another aspect of the present invention, a method for updating a pointer value by using the above pointer register device includes the steps of: switching the read select section to select a second pointer register of the register set from a state where the read select section and the write select section selects a first pointer register of the register set; adding a pointer value read from the second pointer register and the prescribed additional value and writing the sum to the first pointer register by using the adding section; and switching the write select section to select the second pointer register.

According to the above method, the operation of updating a pointer value can be conducted at a high speed, as in the case of the above pointer register device.

BRIEF DESCRIPTION OF THE DRAWINGS

FIG. 4 illustrates an example of loop processing including initial-pointer updating operation by the pointer register device;

DESCRIPTION OF THE PREFERRED EMBODIMENTS

Hereinafter, an embodiment of the present invention will be described in conjunction with the accompanying drawings.

Figure 1:
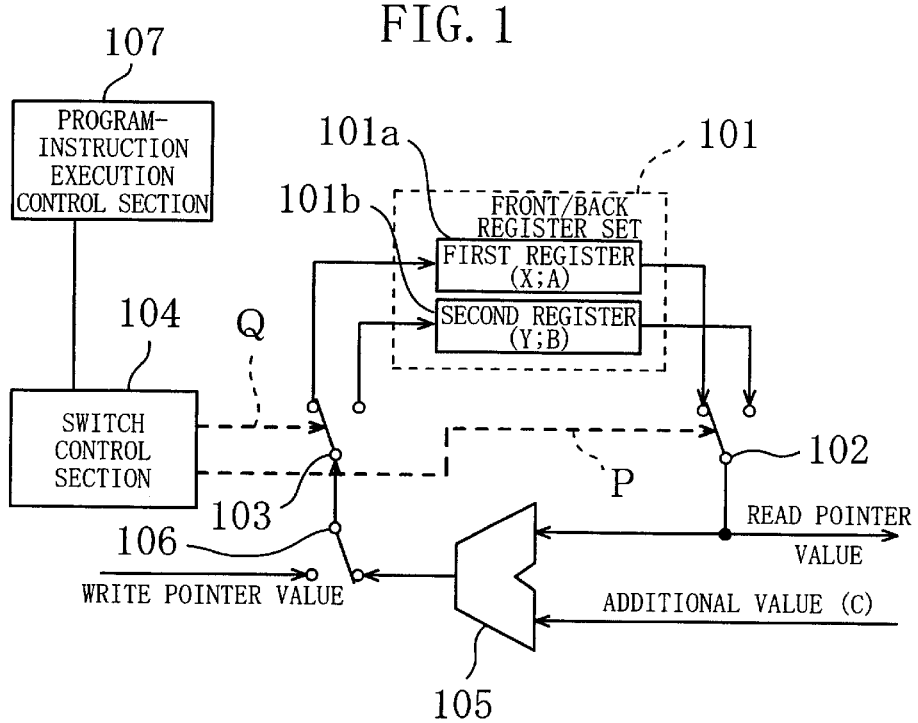
FIG. 1 is a circuit diagram of the structure of a pointer register device according to an embodiment of the present invention.

FIG. 1 is a circuit diagram of the structure of a pointer register device for retaining a pointer value, i.e., an address for accessing a memory.

In FIG. 1, a front/back register set 101 includes a first register 101a and a second register 101b for retaining a pointer value. The front/back register set 101 is basically recognized as a single register when viewed from the outside of the pointer register device (i.e., from a program instruction). Either the register 101a or 101b selected according to the program instruction or the like is accessed. In other words, in reading and writing a pointer value, the registers 101a, 101b need not be distinguished from the outside. (Note that the term "front/back register set" herein refers to a set of registers 101a, 101b that are used in an alternative manner. Therefore, the "front/back register set" is different from a "register pair", i.e., a pair of registers that are used together as a single register having a double bit length. Moreover, the terms "front" and "back" are merely used to distinguish the selected register from the non-selected one, and are not used to fixedly distinguish between the first and second registers 101a, 101b.) Note that, in general, a processor may include a plurality of register sets. For simplicity of description, it is herein assumed that the processor includes a single register set (front/back register set 101).

A read select switch 102 (read select section) selects either the register 101a or 101b in order to read a pointer value therefrom.

A write select switch 103 (write select section) selects either the register 101a or 101b in order to write a pointer value thereto.

A switch control section 104 controls the respective switching states of the read select switch 102, the write select switch 103 and an adder select switch 106. The switch control section 104 is capable of controlling the switches 102, 103 independently of each other. In other words, the switch control section 104 allows the switches 102, 103 to select different registers 101a, 101b. For example, the switch control section 104 retains information designating the register (101a or 101b) from or to which a pointer value is to be read or written, and outputs switch signals P, Q based on that information to control section 104 thus switches the switches 102, 103.

An adder 105 (adding section) adds a pointer value retained in the register 101a, 101b and an additional value applied from the outside of the pointer register device. The term "add" herein includes addition, subtraction and the like.

The adder select switch 106 selects either the addition result of the adder 105 or a write pointer value applied from the outside of the pointer register device for input to the front/back register set 101.

A program-instruction execution control section 107 controls operation of each part based on a program instruction.

When executing a program instruction to switch between the registers 101a and 101b, the program-instruction execution control section 107 instructs the switch control section 104 to switch the switches 102, 103. Basically, when executing other program instructions including an instruction to write or read a pointer value, the program-instruction execution control section 107 will not instruct the switch control section 104 to switch the switches 102, 103. As described above, the pointer value is thus written to or read from either the register 101a or 101b that has already been selected. However, during the operations of updating a pointer value described below, the program-instruction execution control section 107 controls switching of the switches 102, 103 or the like as necessary.

Typical operations in the above pointer register device include: (A) "relative-pointer updating operation"; (B) "base-pointer updating operation"; (C) "initial-pointer updating operation"; and (D) "pointer-value transfer". Hereinafter, these operations will be described specifically.

(A) Relative-Pointer Updating Operation

The relative-pointer updating operation (hereinafter, operation (A)) is the operation of replacing an original pointer value retained in the front/back register set 101 with a pointer value for actual access to a memory (i.e., an effective address). More specifically, the original pointer value retained in one register of the front/back register set 101 and a relative pointer value designated by a program instruction or the like are added, and the sum is written to that register.

Operation (A) will now be described specifically with reference to FIG. 2. It is herein assumed that an original pointer value A retained in the first register 101a is to be replaced with the sum of the original pointer value A and an additional value C, i.e., (A+C).

Figure 2:
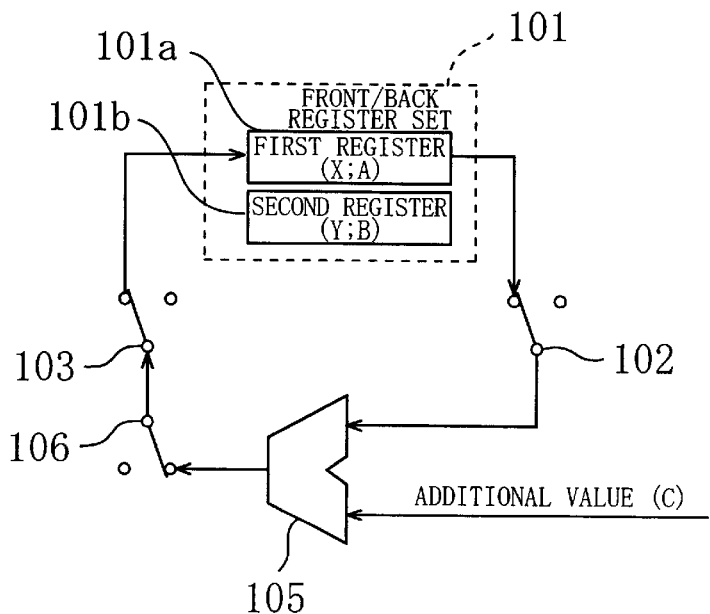
FIG. 2 illustrates relative-pointer updating operation of the pointer register device.

(0) The respective switching states of the read select switch 102 and the write select switch 103 are as shown in FIG. 2 before operation (A). More specifically, the read select switch 102 and the write select switch 103 select the first register 101a. In this state, it is possible to output a pointer value in the first register 101a to the outside of the pointer register device according to a program instruction to access a memory. It is also possible to write an additional pointer value to the first register 101a if the adder select switch 106 is switched to select an external write pointer value.

(1) In this state, the pointer value A read from the first register 101a and the external additional value C are applied to the adder 105. The adder 105 adds the pointer value A and the value C. The sum (A+C) is then written to the first register 101a.

The above operation is given by the following assignment statement:

$$X=(X;\ A)+C\text{(as a result, }X;\ (A+C)\text{)}$$

where "X" is a variable indicating the first register 101a, and "X; A" indicates the state in which the first register 101a retains the pointer value A therein.

Figure 6:
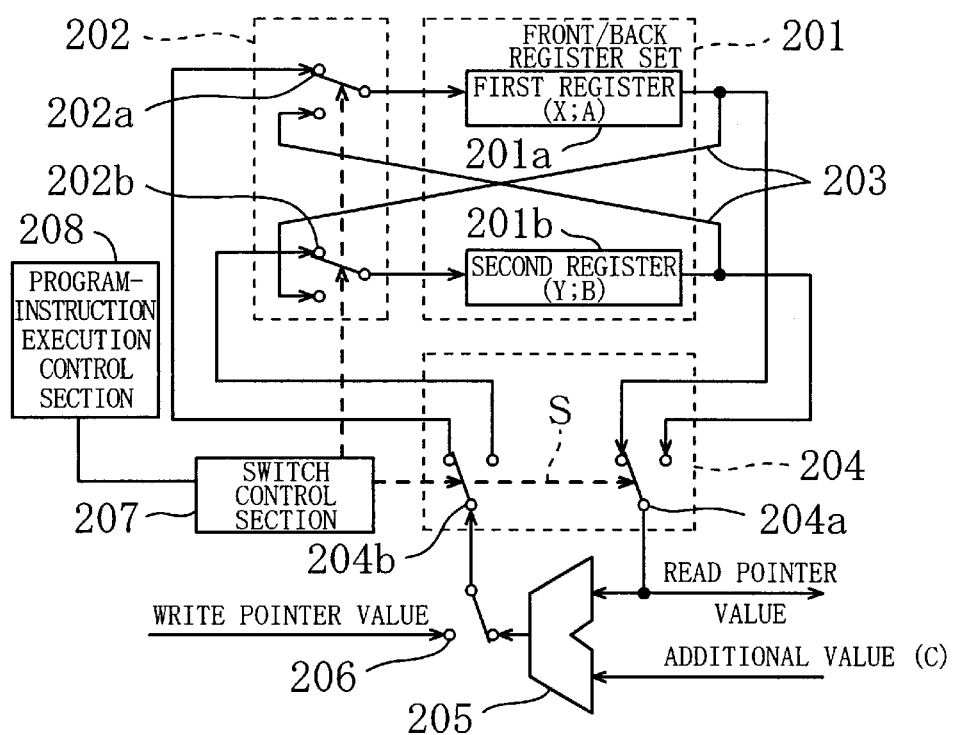
FIG. 6 is a circuit diagram of the structure of a conventional pointer register device.
Figure 7:
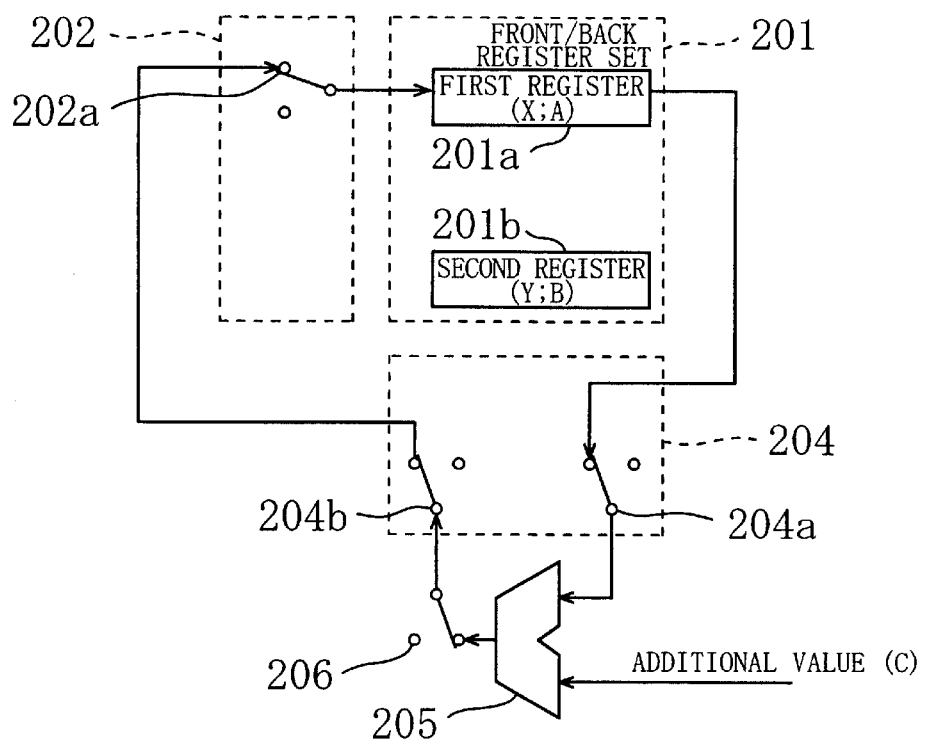
FIG. 7 illustrates relative-pointer updating operation of the conventional pointer register device.
Figure 8A:
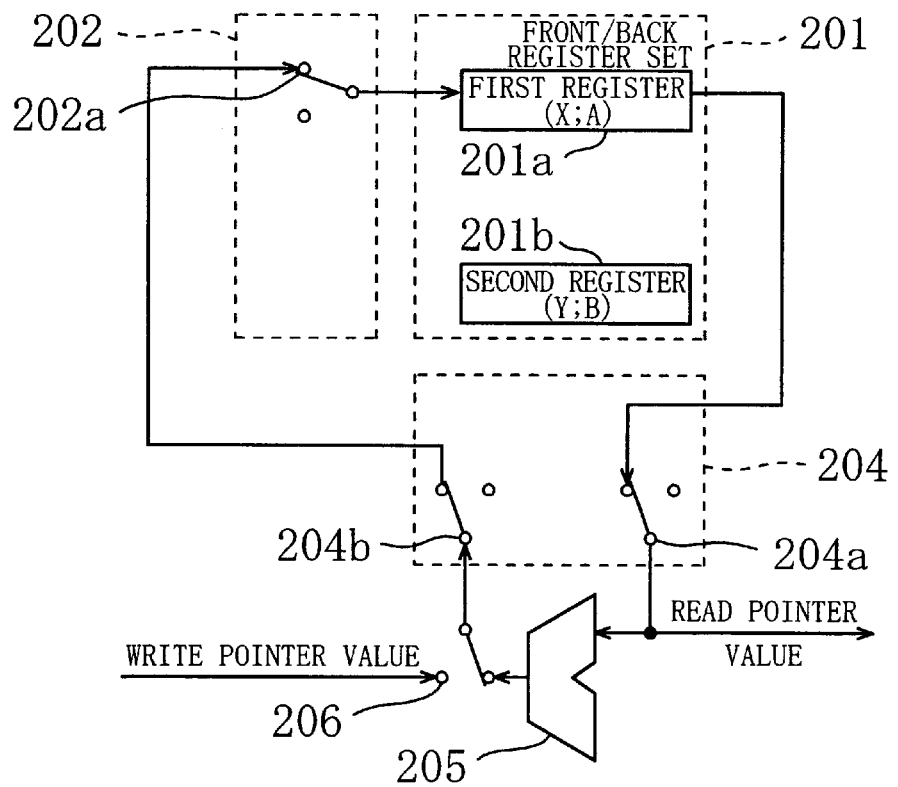
FIGS. 8A and 8B illustrate base-pointer updating operation of the conventional pointer register device.
Figure 8B:
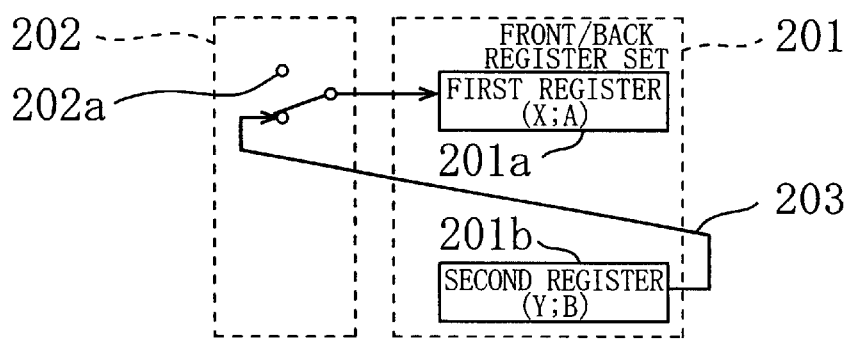
Figure 9A:
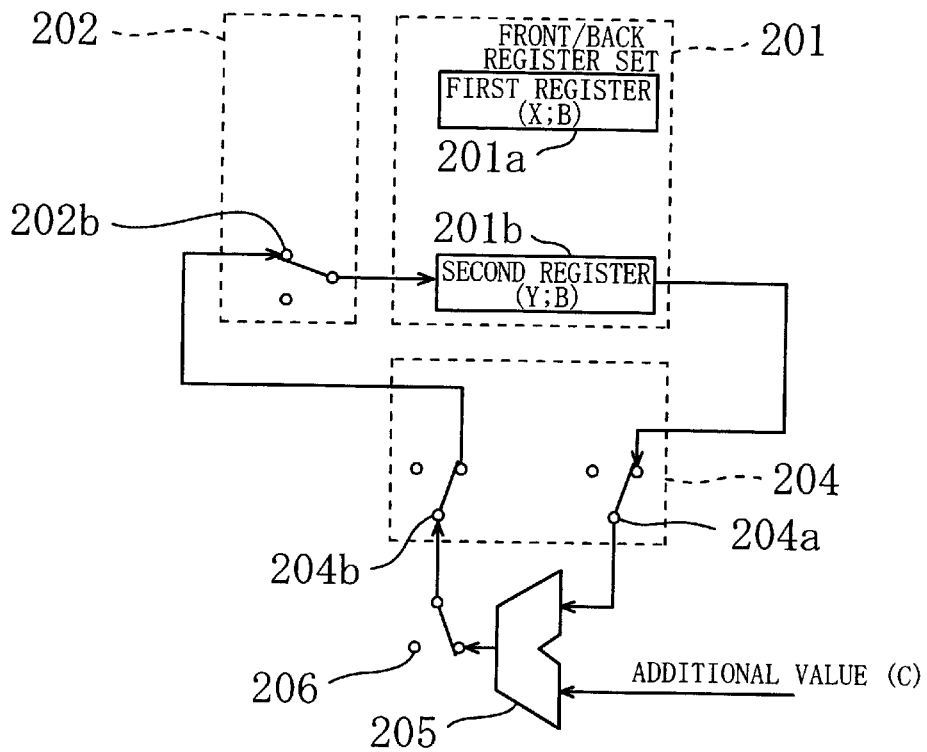
FIGS. 9A and 9B illustrate initial-pointer updating operation of the conventional pointer register device.
Figure 9B:
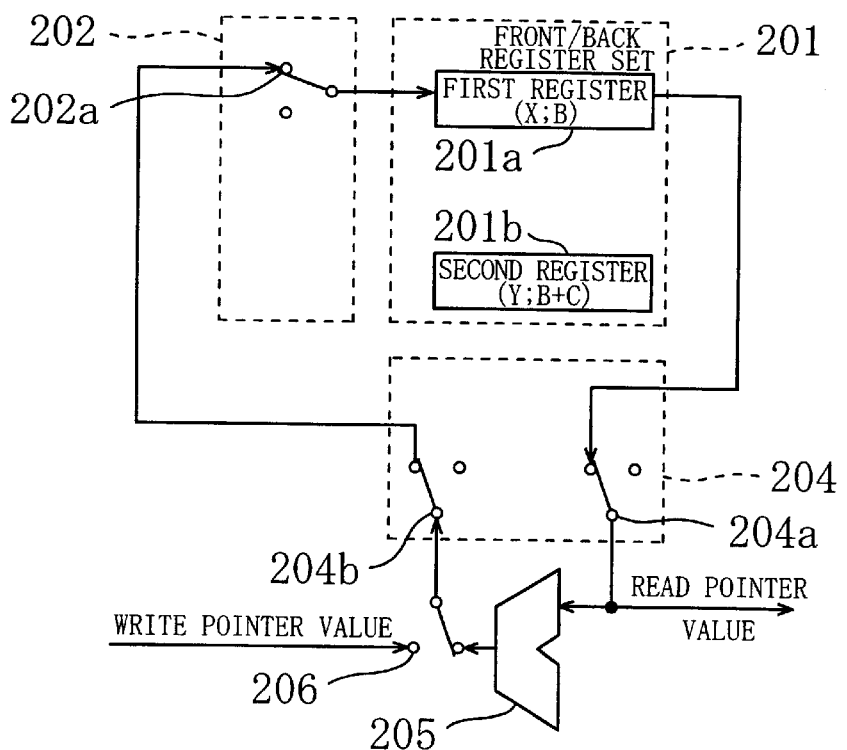

In the case where the first register 101a can be written and read simultaneously (e.g., in the case where the first register 101a is based on a master-slave-type flip-flop), the above operation (A) can be conducted in a single machine cycle as in the above conventional pointer register device. However, since the pointer register device of FIG. 1 does not include the transfer path 203 and the transfer switch set 202 shown in FIG. 6, the circuit scale is suppressed.

Note that the same operation is conducted even when the second register 101b is selected instead of the first register 101a. In other words, "101a" and "101b" are merely used to distinguish the selected register from the non-selected one. The same operation is conducted whether the register 101a or 101b is selected. The same applies to the following description.

(B) Base-Pointer Updating Operation

The base-pointer updating operation (hereinafter, operation (B)) is the operation of obtaining the sum of a pointer value (base pointer value) retained in the front/back register set 101 and a relative pointer value, as in operation (A). Operation (B) is different from operation (A) in that the sum thus obtained is stored in the other register (i.e., the register that does not retain the base pointer value). Provided that the base pointer value B is retained in one register (e.g., the second register 101b), the sum of the base pointer value B and the additional value C, (B+C), must be stored in the other register (first register 101a). This is because the base pointer value B need be stored for use in later processing. Operation (B) will now be described specifically.

Figure 3A:
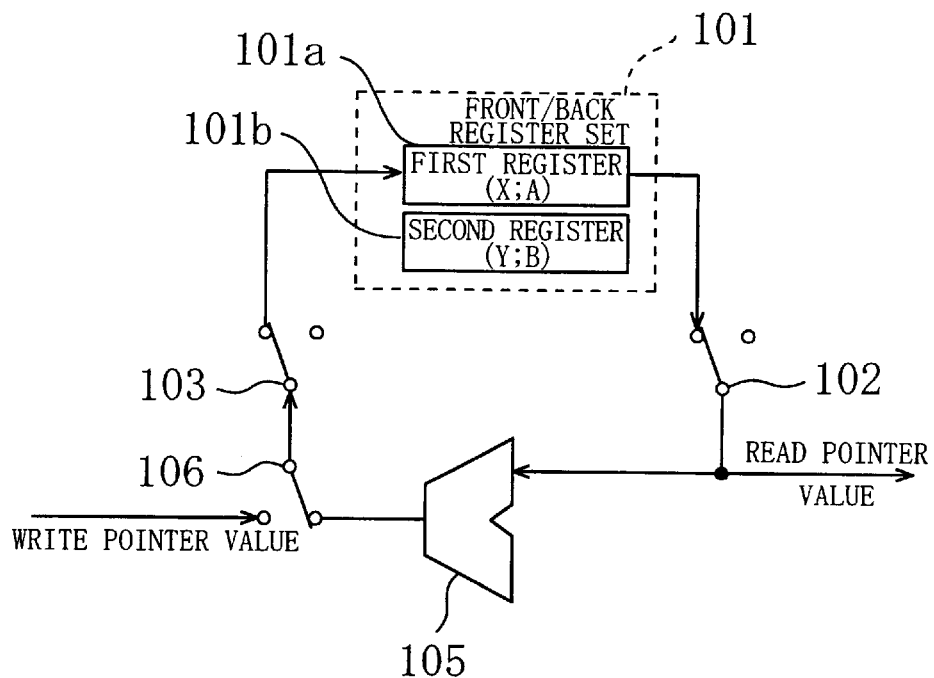
FIGS. 3A and 3B illustrate base-pointer updating operation of the pointer register device.

(0) The respective switching states of the read select switch 102 and the write select switch 103 are as shown in FIG. 3A before operation (B). More specifically, the read select switch 102 and the write select switch 103 select the first register 101a. It is herein assumed that the second register 101b retains the base pointer value B.

Figure 3B:
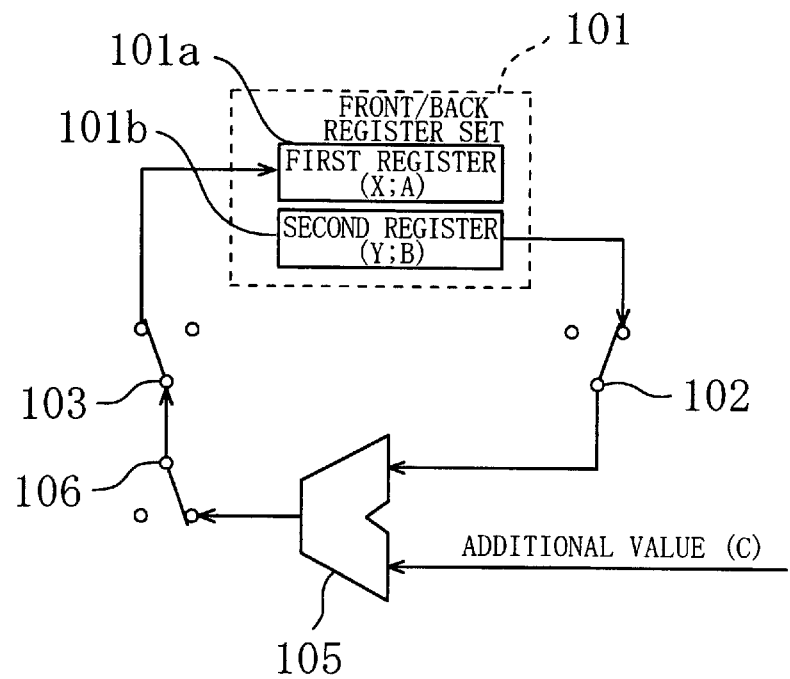

(1) In operation (B), the read select switch 102 is first switched to the second register 101b as shown in FIG. 3B. The base pointer value B is then read from the second register 101b to the adder 105. The adder 105 adds the base pointer value B and the additional value C. The sum (B+C) is written to the first register 101a. The read select switch 102 is switched back to the first register 101a after the base pointer value B is read from the second register 101b.

The above operation is given by the following assignment statement:

$$X=(Y; B)+C \text{(as a result, } X; (B+C))$$

where "X" is a variable indicating the first register 101a, "Y" is a variable indicating the second register 101b, and "Y; B" indicates the state in which the second register 101b retains the base pointer value B therein.

In operation (B), the steps of reading and adding the base pointer value and storing the addition result can be conducted in a single machine cycle as in operation (A). The read select switch 102 need only be switched to the second register 101b before the base pointer value is read from the second register 101b. Moreover, the read select switch 102 need only be switched back to the first register 101a between the step of reading the base pointer value from the second register 101b to the adder 105 and the step of reading the pointer value from the first register 101a according to the subsequent program instruction. Accordingly, no machine cycle is required for such switching of the read select switch 102.

Accordingly, operation (B) can be conducted in a single machine cycle, enabling rapid processing. Moreover, operation (B) can be conducted without transferring the pointer value between the registers 101a and 101b. This eliminates the need for the transfer path 203 and the transfer switch set 202 shown in FIG. 6, suppressing the circuit scale.

(C) Initial-Pointer Updating Operation

The initial-pointer updating operation (hereinafter, operation (C)) is used for, e.g., loop processing (processing of sequentially accessing the elements in an array). For example, in order to sequentially access the elements in a two-dimensional array α[i][j] shown in FIG. 4, a memory region corresponding to addresses B to (B+C−1) is accessed in the first loop processing, and a memory region corresponding to addresses (B+C) to (B+2C−1) is accessed in the second loop processing. Such processing can be easily conducted by retaining a pointer value B (an initial value to be sequentially incremented) in one register in the first processing, and retaining a pointer value (B+C) in the other register as an initial value of the second loop processing.

Operation (C) Used in Such Processing or the Like will now be Described Specifically.

Figure 5A:
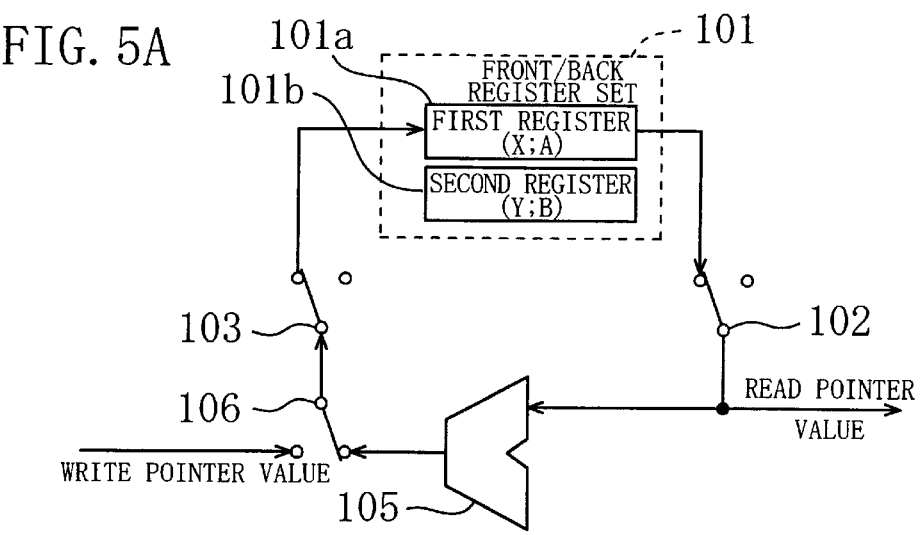
FIGS. 5A to 5C illustrate initial-pointer updating operation of the pointer register device.

(0) The respective switching states of the read select switch 102 and the write select switch 103 are as shown in FIG. 5A before operation (C). More specifically, like operation (B) (FIG. 3A), the read select switch 102 and the write select switch 103 select the first register 101a. It is herein assumed that the second register 101b retains a pointer value B that is used as an initial value in the subsequent loop processing or the like.

Figure 5B:
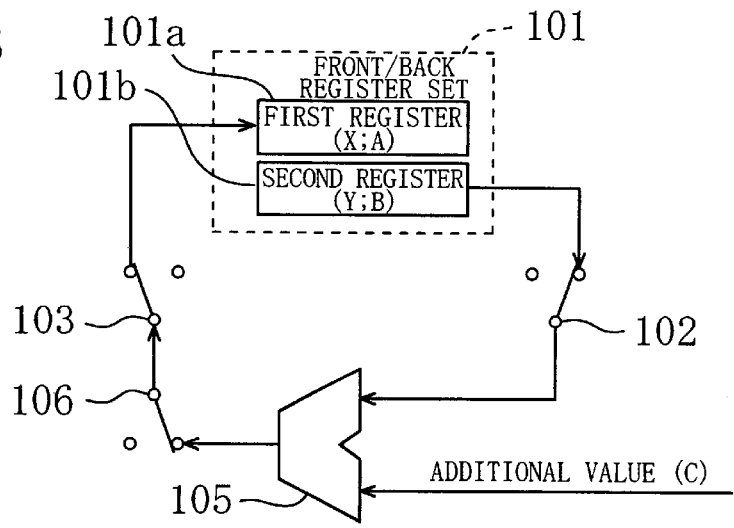
Figure 5C:
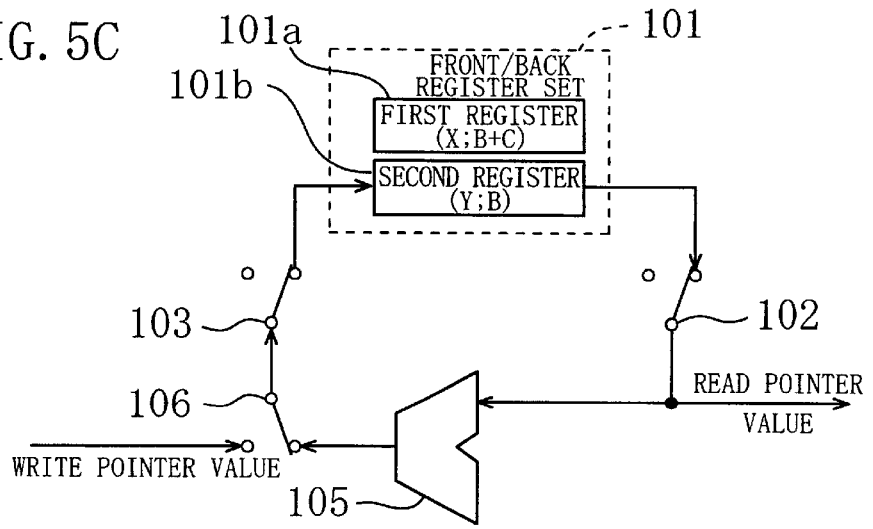

(1) In operation (C), like operation (B) (FIG. 3B), the read select switch 102 is first switched to the second register 101b as shown in FIG. 5B. The pointer value B is then read from the second register 101b to the adder 105. The adder 105 adds the pointer value B and the additional value C. The sum (B+C) is written to the first register 101a. Operation (C) is different from operation (B) in that the read select switch 102 is not switched back to the first register 101a after the pointer value B is read from the second register 101b. In operation (C), the write select switch 103 is switched to the second register 101b, as shown in FIG. 5C. The sum (B+C) is retained in the first register 101a for use in the subsequent loop processing or the like. The pointer value B in the second register 101b is retained as a pointer value to be sequentially incremented by, e.g., operation (A) in the subsequent loop processing or the like.

The above operation is given by the following assignment statement:

$$X=(Y; B)+C \text{(as a result, } X; (B+C)).$$

It should be noted that the second register 101b remains in the state (Y; B). The second register 101b is used in read or write operation after operation (C).

Before operation (C), the switches 102, 103 select the first register 101a. In other words, a pointer value is ready to be read from and written to the first register 101a. After operation (C), however, the switches 102, 103 select the second register 101b. Which of the registers 101a, 101b is selected does not matter when viewed from the outside of the pointer register device. The only requirement is that a register storing a necessary pointer value be selected. Accordingly, a pointer value need not be transferred between the registers 101a and 101b. As a result, operation (C) can be conducted in a single machine cycle, and the circuit scale can be suppressed.

(D) Pointer-Value Transfer

Although the pointer register device of FIG. 1 does not include any special path for transferring a pointer value between the registers 101a and 101b, the pointer value can be transferred in the present embodiment as follows:

Provided that the additional value C is zero, the pointer value in the second register 101b is transferred to the first register 101a by the same operation as operation (B) (FIG. 3B). In other words, the adder 105 serves as a transfer path. By switching the write select switch 103 from the state of FIG. 3A to the second register 101b (while the read select switch 102 still selects the first register 101a), the pointer value in the first register 101a can be transferred to the second register 101b.

(E) Other Operation

In the above operations (B) and (C), the read select switch 102 is first switched. Alternatively, the write select switch 103 may be switched first, e.g., when the control jumps to a subroutine.

(0) It is herein assumed that the read select switch 102 and the write select switch 103 now select the first register 101a and the first register 101a retains a pointer value A that is used in, e.g., a main routine.

(1) When the control jumps to a subroutine, the write select switch 103 is first switched to the second register 101b. The pointer A used in the main routine is then read from the first register 101a to the adder 105. The adder 105 adds the pointer value A and the additional value C. The sum (A+C) is written to the second register 101b. In other words, the pointer value A used in the main routine is still retained in the first register 101a, whereas the pointer value (A+C) to be used in the subroutine, i.e., the pointer value A of the main routine being offset by the relative value C, is retained in the second register 101b. After the pointer value A is read from the first register 101a, the read select switch 102 is also switched to the second register 101b. The pointer value (A+C) is thus used for read and updating operations in the subroutine.

When the control returns from the subroutine to the main routine, the read select switch 102 and the write select switch 103 need only be switched back to the first register 101a. In this way, the original pointer value A can be read from the first register 101a. In other words, the control returns to the main routine in a single machine cycle.

Note that the front/back register set 101 includes two registers 101a, 101b in the above example. However, the present invention is not limited to this. The same effects as those described above are obtained even when the front/back register set 101 includes a plurality of registers. More specifically, by enabling the registers to be selected independently in order to read and write a pointer value, various pointer updating operations can be conducted at a high speed as well as the circuit scale can be suppressed.

As has been described above, according to the present invention, the write select section selects a pointer register different from that of the read select section. This enables the same pointer value as that read from a pointer register to be retained therein while replacing a pointer value in another pointer register with the sum obtained by the adding section. In this case, the pointer value need not be transferred between the pointer registers. As a result, various pointer operations can be conducted rapidly. Moreover, no transfer path is required between the pointer registers, whereby the circuit scale can be suppressed.

What is claimed is:

1. A pointer register device, comprising:
   a register set including a plurality of pointer registers for retaining a pointer value;
   a read select section for selecting a pointer register from the register set in order to read a pointer value therefrom;
   a write select section for selecting a pointer register from the register set in order to write a pointer value thereto;
   a switch control section for controlling respective switching states of the read select section and the write select section;
   an adding section for adding the pointer value read from the pointer register selected by the read select section and a prescribed additional value, and writing the sum to the pointer register selected by the write select section; and
   a program-instruction execution control section responsive to a program instruction, for controlling operation of writing a pointer value applied from outside of the pointer register device to a pointer register that is selected in advance before executing the program instruction, and reading a pointer value from the selected pointer register to the outside of the pointer register device, wherein
   the switch control section allows the read select section and the write select section to select different pointer registers.

2. The pointer register device according to claim 1, wherein when a prescribed program instruction is executed with a first pointer register of the register set being selected by the read select section and the write select section, the read select section first selects a second pointer register of the register set, the adding section then adds a pointer value read from the second pointer register and the prescribed additional value and writes the sum to the first pointer register, and thereafter the read select section selects the first pointer register again.

3. The pointer register device according to claim 1, wherein when a prescribed program instruction is executed with a first pointer register of the register set being selected by the read select section and the write select section, the read select section first selects a second pointer register of the register set, the adding section then adds a pointer value read from the second pointer register and the prescribed additional value and writes the sum to the first pointer register, and thereafter the write select section selects the second pointer register.

4. A method for updating a pointer value by using a pointer register device, the pointer register device including
   a register set including a plurality of pointer registers for retaining a pointer value,
   a read select section for selecting a pointer register from the register set in order to read a pointer value therefrom,
   a write select section for selecting a pointer register from the register set in order to write a pointer value thereto,
   a switch control section for controlling respective switching states of the read select section and the write select section,
   an adding section for adding the pointer value read from the pointer register selected by the read select section and a prescribed additional value, and writing the sum to the pointer register selected by the write select section, and
   a program-instruction execution control section responsive to a program instruction, for controlling operation of writing a pointer value applied from outside of the pointer register device to a pointer register that is selected in advance before executing the program instruction, and reading a pointer value from the selected pointer register to the outside of the pointer register device, wherein
   the switch control section allows the read select section and the write select section to select different pointer registers, the method comprising the steps of:
   switching the read select section to select a second pointer register of the register set from a state where the read select section and the write select section selects a first pointer register of the register set;
   adding a pointer value read from the second pointer register and the prescribed additional value and writing the sum to the first pointer register by using the adding section; and switching the read select section to select the first pointer register again.

5. A method for updating a pointer value by using a pointer register device, the pointer register device including a register set including a plurality of pointer registers for retaining a pointer value, a read select section for selecting a pointer register from the register set in order to read a pointer value therefrom, a write select section for selecting a pointer register from the register set in order to write a pointer value thereto, a switch control section for controlling respective switching states of the read select section and the write select section, an adding section for adding the pointer value read from the pointer register selected by the read select section and a prescribed additional value, and writing the sum to the pointer register selected by the write select section, and a program-instruction execution control section responsive to a program instruction, for controlling operation of writing a pointer value applied from outside of the pointer register device to a pointer register that is selected in advance before executing the program instruction, and reading a pointer value from the selected pointer register to the outside of the pointer register device, wherein the switch control section allows the read select section and the write select section to select different pointer registers, the method comprising the steps of:

switching the read select section to select a second pointer register of the register set from a state where the read select section and the write select section selects a first pointer register of the register set;

adding a pointer value read from the second pointer register and the prescribed additional value and writing the sum to the first pointer register by using the adding section; and switching the write select section to select the second pointer register.

* * * * *